US011106277B2

(12) United States Patent
Kim et al.

(10) Patent No.: US 11,106,277 B2
(45) Date of Patent: Aug. 31, 2021

(54) CARTOON STATISTICAL READING DATA METHOD AND APPARATUS

(71) Applicant: NAVER CORPORATION, Seongnam-si (KR)

(72) Inventors: Hyo Kim, Seongnam-si (KR); Hyun Chul Lee, Seongnam-si (KR); Ji Han Kim, Seongnam-si (KR); Dai Hyun Lim, Seongnam-si (KR); Byoung Kwan Kim, Seongnam-si (KR); Myeong Seok Yang, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 132 days.

(21) Appl. No.: 15/671,831

(22) Filed: Aug. 8, 2017

(65) Prior Publication Data

US 2017/0336868 A1 Nov. 23, 2017

Related U.S. Application Data

(63) Continuation of application No. PCT/KR2015/012654, filed on Nov. 24, 2015.

(30) Foreign Application Priority Data

Feb. 9, 2015 (KR) .................. 10-2015-0019730

(51) Int. Cl.
*G06F 3/0481* (2013.01)
*G06F 3/0346* (2013.01)
(Continued)

(52) U.S. Cl.
CPC ............ *G06F 3/013* (2013.01); *G06F 3/0485* (2013.01); *G06F 2203/04803* (2013.01); *G06Q 30/0241* (2013.01)

(58) Field of Classification Search
CPC ................ G06F 3/013; G06F 3/0485; G06F 2203/04803; G06F 16/2462; G06F 17/00; G06Q 30/0241
See application file for complete search history.

(56) References Cited

U.S. PATENT DOCUMENTS 9,330,417 B2 *  5/2016  Moharram ............ G06Q 50/01
9,692,841 B1 *  6/2017  Chandler ................ H04L 67/10
(Continued)

FOREIGN PATENT DOCUMENTS

JP     2003150772 A    5/2003
JP     2007-141059 A   6/2007
(Continued)

OTHER PUBLICATIONS

Notice of Allowance of the Korean Patent App. No. 10-2016-0157422, which is a Divisional App. of the Korean Priority App. No. 10-2015-0019730, dated Aug. 10, 2017.
(Continued)

*Primary Examiner* — Jennifer N To
*Assistant Examiner* — K C Chen
(74) *Attorney, Agent, or Firm* — Greer, Burns & Crain, Ltd.

(57) ABSTRACT

Provided is a method of providing statistical data related to cartoon data provided to a cartoon data display apparatus, the method including: obtaining, by a controller, first cartoon reading information by analyzing a cartoon reading pattern of a first user when the first user reads first cartoon data; generating, by the controller, first statistical data from the obtained first cartoon reading information; and providing, by a communication unit, the generated first statistical data to an external apparatus in communication with the controller.

12 Claims, 9 Drawing Sheets

(51) Int. Cl.
*G06F 3/0338* (2013.01)
*G06F 3/01* (2006.01)
*G06T 7/50* (2017.01)
*G06F 3/0485* (2013.01)
*G06Q 30/02* (2012.01)

(56) References Cited

U.S. PATENT DOCUMENTS

| | | | |
|---|---|---|---|
| 2003/0093312 A1 | 5/2003 | Ukita et al. | |
| 2008/0295036 A1* | 11/2008 | Ikeda | G06T 11/206 |
| | | | 715/848 |
| 2013/0027302 A1* | 1/2013 | Iwaizumi | G06F 1/1686 |
| | | | 345/158 |
| 2013/0080471 A1* | 3/2013 | Forte | G06F 21/6218 |
| | | | 707/785 |
| 2013/0117702 A1 | 5/2013 | Jang et al. | |
| 2013/0227459 A1* | 8/2013 | Olausson | G06F 3/0484 |
| | | | 715/772 |
| 2014/0108202 A1 | 4/2014 | Masuko | |
| 2014/0172579 A1* | 6/2014 | Peterson | G06Q 30/0269 |
| | | | 705/14.66 |

FOREIGN PATENT DOCUMENTS

| | | |
|---|---|---|
| JP | 2008089717 A | 4/2008 |
| JP | 2010165009 A | 7/2010 |
| JP | 2012123093 A | 6/2012 |
| JP | 2012137840 A | 7/2012 |
| JP | 2012194772 A | 10/2012 |
| JP | 2013008165 A | 1/2013 |
| JP | 2013101618 A | 5/2013 |
| KR | 10-0320161 B1 | 1/2002 |
| KR | 1020030013535 A | 2/2003 |
| KR | 10-2004-0079194 A | 9/2004 |
| KR | 1020080033033 A | 4/2008 |
| KR | 10-2010-00066862 A | 6/2010 |
| WO | 2013145394 A1 | 10/2013 |
| WO | WO 2014/093104 A1 | 6/2014 |

OTHER PUBLICATIONS

Int'l. Search Report issued in Int'l. App. No. PCT/KR2015/012654, dated Mar. 2, 2016.
Office Action issued in corresponding Japanese Patent application No. 2017-559266, dated Aug. 21, 2018.
Office Action issued in corresponding Japanese Patent application No. 2017-559266, dated Apr. 2, 2019.
Office Action issued in corresponding Japanese Patent application No. 2017-559266, dated Nov. 1, 2019.

* cited by examiner

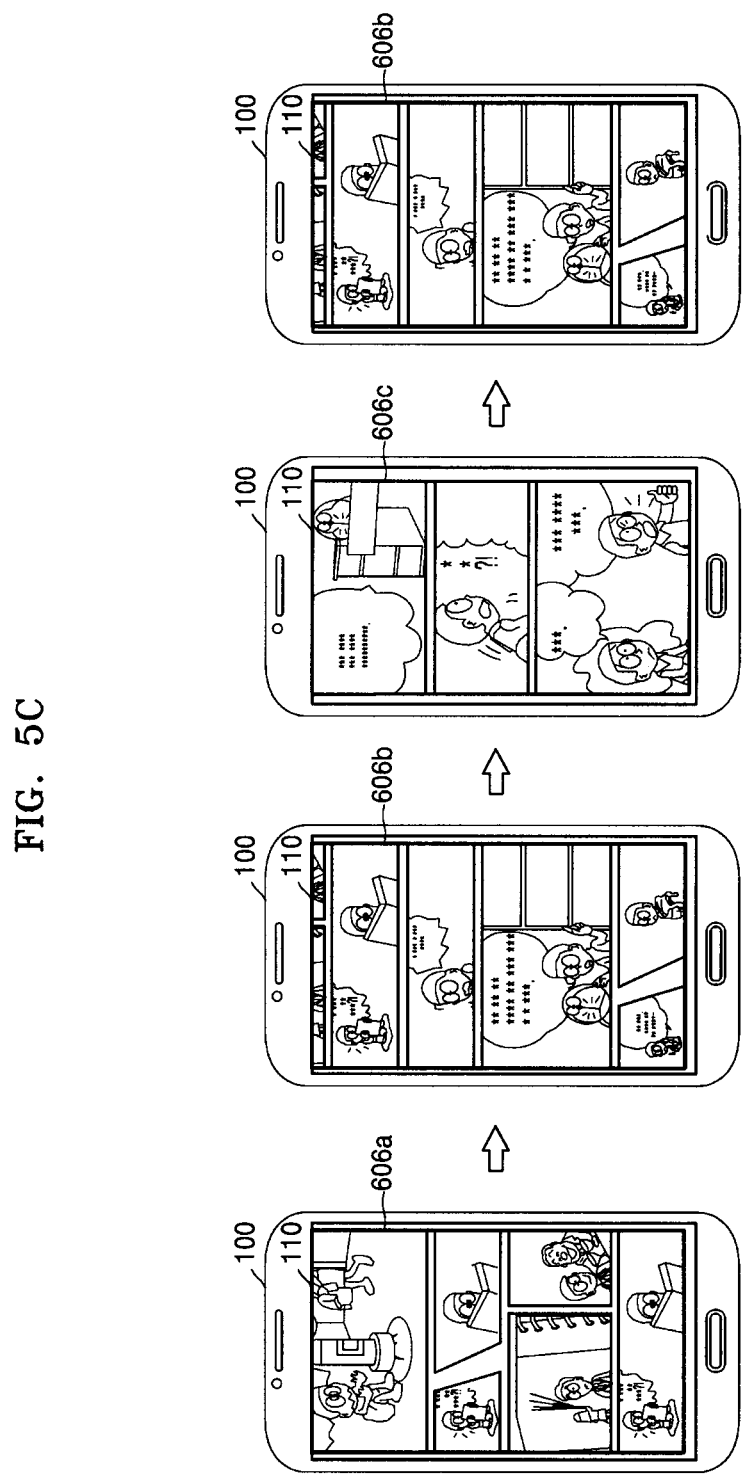

CARTOON STATISTICAL READING DATA METHOD AND APPARATUS

CROSS-REFERENCE TO RELATED APPLICATIONS

This is a continuation application of International Application No. PCT/KR2015/012654, filed Nov. 24, 2015, which claims benefit of Korean Patent Application No. 10-2015-0019730, filed Feb. 9, 2015.

BACKGROUND OF THE INVENTION

Field of Invention

The present disclosure relates to a statistical data providing method and a statistical data providing apparatus.

Description of Related Art

A cartoon is a picture intended to satirize or criticize life or society by exaggerating or omitting the features of an object and using humor, caricature, social commentary, etc. Cartoons may be classified into various types, such as a romance cartoon, a martial arts cartoon, an action cartoon, a comic cartoon, a sports cartoon, a science fiction (SF) cartoon, etc., according to the contents thereof. A cartoon visually depicts complex details by using a visual system of images and text and is thus more effective in attracting the attention of readers than a general book containing only text.

Recently, cartoons have been provided not only through traditional comic books but also via the Internet or the like.

Information disclosed in this Background section was already known to the inventors before achieving the inventive concept or is technical information acquired in the process of achieving the inventive concept. Therefore, it may contain information that does not form the prior art that is already known to the public in this country.

BRIEF SUMMARY OF THE INVENTION

It is required to obtain cartoon reading information of a user, generate statistical data from the obtained information, and provide the generated statistical data. Pieces of statistical data generated from different users or different pieces of cartoon data need to be distinguished and provided. Statistical data is generated in consideration of a cartoon reading time of a user, whether the user repeatedly read a cartoon, whether the user stopped reading the cartoon, whether the user wrote a comment, or whether the user left feedback about the cartoon.

According to an aspect of an embodiment, a method of providing statistical data related to cartoon data includes: obtaining, by a controller, first cartoon reading information by analyzing a cartoon reading pattern of a first user when the first user reads first cartoon data; generating, by the controller, first statistical data from the obtained first cartoon reading information; and providing, by a communication unit, the generated first statistical data to an external apparatus.

According to an aspect of another embodiment, an apparatus for providing statistical data includes: a controller configured to obtain first cartoon reading information by analyzing a cartoon reading pattern of a first user when the first user reads first cartoon data, and generate first statistical data from the obtained first cartoon reading information; and a communication unit configured to provide the generated first statistical data to an external apparatus.

These and/or other aspects will become apparent and more readily appreciated from the following description of the embodiments, taken in conjunction with the accompanying drawings.

According to the present disclosure a statistical data providing method and a statistical data providing apparatus, in which cartoon reading information of a user is obtained, statistical data is generated from the obtained information, and the generated statistical data is provided, may be provided.

Also, a statistical data providing method and a statistical data providing apparatus, in which pieces of statistical data generated from different users or different pieces of cartoon data are distinguished and provided, may be provided.

Also, a statistical data providing method and a statistical data providing apparatus, in which statistical data is generated in consideration of a cartoon reading time of a user, whether the user repeatedly read a cartoon, whether the user stopped reading the cartoon, whether the user wrote a comment, or whether the user left feedback about the cartoon, may be provided.

BRIEF DESCRIPTION OF THE DRAWINGS

FIGS. 5A through 5C are schematic diagrams for describing a method of obtaining cartoon reading information for generating statistical data by a statistical data providing apparatus, according to an embodiment of the present disclosure.

DETAILED DESCRIPTION OF THE INVENTION

Figure 1:
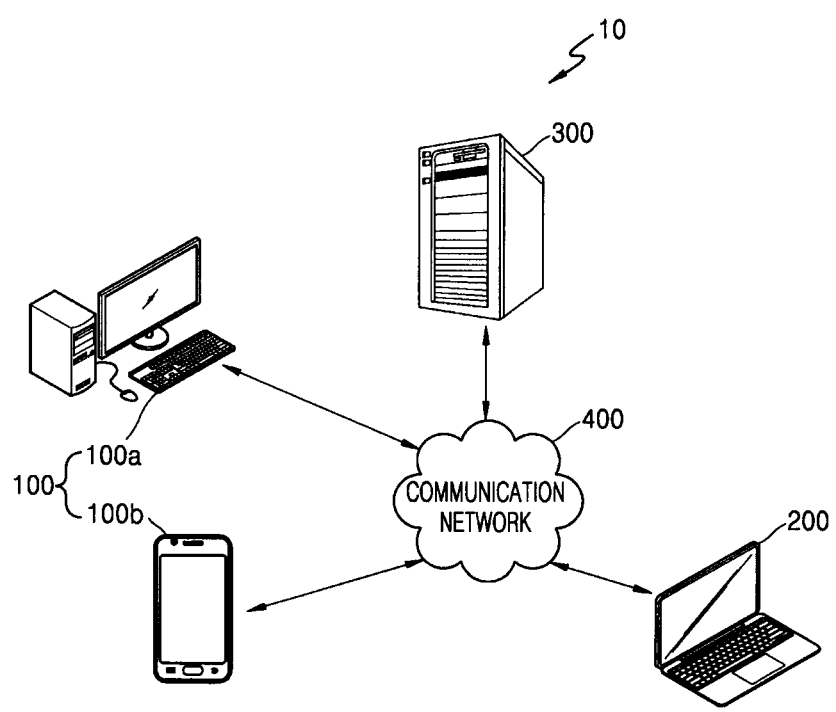
FIG. 1 is a schematic diagram of a structure of a statistical data providing system, according to an embodiment of the present disclosure.

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description. While such terms as "first", "second", etc., may be used to describe various components, such components must not be limited to the above terms. The above terms are used only to distinguish one component from another. An expression used in the singular encompasses the expression of the plural, unless it has a clearly different meaning in the context. In the present specification, it is to be understood that the terms such as "including" or "having," etc., are intended to indicate the existence of the features or components, and are not intended to preclude the possibility that one or more other features or components may exist or may be added. In drawings, for convenience of description, sizes of components may be exaggerated for clarity. For example, since sizes and thicknesses of components in drawings are arbitrarily shown for convenience of description, the sizes and thicknesses are not limited thereto.

Hereinafter, embodiments of the present disclosure will be described below in more detail with reference to the accompanying drawings. Those components that are the same or are in correspondence are rendered the same reference numeral regardless of the figure number, and redundant explanations are omitted.

FIG. 1 is a schematic diagram of a structure of a statistical data providing system, according to an embodiment of the present disclosure.

Referring to FIG. 1, a statistical data providing system 10 according to an embodiment of the present disclosure includes a cartoon data display apparatus 100. Also, the statistical data providing system 10 includes a cartoon data providing apparatus 200. Also, the statistical data providing system 10 includes a server 300. Also, the statistical data providing system 10 includes a communication network 400 connecting the cartoon data display apparatus 100, the cartoon data providing apparatus 200, and the server 300 to each other.

The cartoon data display apparatus 100 may be an apparatus capable of displaying cartoon data. The cartoon data display apparatus 100 may denote a communication terminal capable of exchanging data with another apparatus under a wired/wireless communication environment. The cartoon data display apparatus 100 may denote any one of various apparatuses capable of displaying cartoon data existing in an internal or external memory, on a display unit of the cartoon data display apparatus 100. A plurality of the cartoon data display apparatuses 100 may be connected to the communication network 400. In FIG. 1, the cartoon data display apparatus 100 is illustrated to be a first cartoon data display apparatus 100a in a form of a smart phone and a second cartoon data display apparatus 100b in a form of a desktop computer, but is not limited thereto.

In detail, the cartoon data display apparatus 100 may be a smart phone, a personal computer (PC), a tablet PC, a smart television (TV), a mobile phone, a personal digital assistant (PDA), a laptop computer, a media player, a micro-server, a global positioning system (GPS) apparatus, an electronic book terminal, a digital broadcasting terminal, a navigation device, a kiosk, an MP3 player, a digital camera, a wearable device, or another mobile or non-mobile computing apparatus, but is not limited thereto.

Also, the cartoon data display apparatus 100 may include one of various apparatuses capable of receiving a touch input, such as an electronic blackboard and a touch table. Also, the cartoon data display apparatus 100 may be an accessory, such as a watch, glasses, a hair band, or a ring, having a communication function or a data processing function, but is not limited thereto.

In the present specification, cartoon data may denote image data including an object, such as alphabet letters, a drawing, or a picture, that is visually recognizable and capable of transmitting information to another person in a visual form, or a group of such objects. The cartoon data may be data created by a cartoonist. The cartoon data may include information about an amount of a plurality of visible objects provided for one episode. One piece of cartoon data may include one or more cuts. Here, the cut denotes data including one scene of one cartoon, and may include a plurality of layers including an image or text. Examples of the cartoon data and examples of how the cartoon data is displayed on the cartoon data display apparatus 100 will be described later with reference to FIGS. 4A and 4B.

The cartoon data display apparatus 100 may further include a display unit. The display unit may display the cartoon data and move the cartoon data according to a user input with respect to the cartoon data. In detail, the cartoon data may be image data having a size too large to be displayed all at once on the display unit. Accordingly, the display unit may display only a partial area of the cartoon data at any one time. Also, the display unit may display another partial area of the cartoon data when the cartoon data is scrolled.

In the present specification, an operation of scrolling the cartoon data may denote an operation of changing a state of displaying a first partial area of the cartoon data on the display unit of the cartoon data display apparatus 100 to a state of displaying a second partial area different from the first partial area on the display unit of the cartoon data display apparatus 100. While the cartoon data is scrolled, cuts included in the first or second partial area or cuts provided between the first and second partial areas may be displayed on the display unit of the cartoon data display apparatus 100 for a certain period of time or longer.

The display unit of the cartoon data display apparatus 100 may include at least one of a liquid crystal display, a thin film transistor-liquid crystal display, an organic light-emitting diode, a 3-dimensional (3D) display, and an electrophoretic display, but is not limited thereto. According to an embodiment of the cartoon data display apparatus 100, the cartoon data display apparatus 100 may include two or more display units.

The cartoon data providing apparatus 200 may be an apparatus used by the cartoonist to provide the cartoon data to the cartoon data display apparatus 100 or the server 300. The cartoon data providing apparatus 200 may be an apparatus used by the cartoonist to directly provide the cartoon data. The cartoon data providing apparatus 200 may be an apparatus in which a cartoon manufacture tool enabling manufacture of the cartoon data or facilitating manufacture of the cartoon data is installed. The cartoon data providing apparatus 200 may be an apparatus capable of exchanging data with another apparatus under a wired/wireless communication environment. The cartoon data providing apparatus 200 may be an apparatus for providing the cartoon data to the server 300. The plurality of cartoon data providing apparatuses 200 may be connected to the communication network 400. In FIG. 1, the cartoon data providing apparatus 200 is illustrated in a form of a laptop computer, but is not limited thereto.

In detail, the cartoon data providing apparatus 200 may be a smart phone, a PC, a tablet PC, a smart TV, a mobile phone, a PDA, a laptop computer, a media player, a micro-server, a GPS apparatus, an electronic book terminal, a digital broadcasting terminal, a navigation device, a kiosk, an MP3 player, a digital camera, a wearable device, or another mobile or non-mobile computing apparatus, but is not limited thereto.

The server 300 may be a server providing the cartoon data to the cartoon data display apparatus 100. The server 300 may store cartoon data to be provided to the cartoon data display apparatus 100. The server 300 may store the cartoon data provided from the cartoon data providing apparatus 200. In FIG. 1, one server is displayed, but there may be a plurality of servers according to traffic or a data amount.

The server 300 may receive information related to a user of the cartoon data display apparatus 100 from the cartoon data display apparatus 100 or may self-generate the information related to the user. Also, the server 300 may store the information related to the user of the cartoon data display apparatus 100. In this case, the server 300 may store information related to users by distinguishing between different cartoon data display apparatuses 100, or by distinguishing between different accounts. For example, the server 300 may store first cartoon reading information related to the first cartoon data display apparatus 100*a* and second cartoon reading information related to the second cartoon data display apparatus 100*b*. As another example, the server 300 may store third cartoon reading information related to a first account and fourth cartoon reading information related to a second account. In other words, the server 300 may distinguish information related to users based on whether apparatuses for displaying cartoon data are different, or based on whether accounts that requested to display cartoon data are different.

The server 300 may provide a general search service and various services promoting user convenience, in addition to a service related to cartoon data. In other words, the server 300 may provide various services, such as a search service, an email service, a blog service, a social network service (SNS), a news service, and a shopping information providing service, in addition to the service related to cartoon data.

Alternatively, the server 300 may be a server providing a webpage provided by a portal service to the cartoon data display apparatus 100 that requests the portal service to provide information, with the server 300 being connected to a server providing the portal service, such as a search service, an email service, a news service, or a shopping service. Here, the server 300 and the portal service providing server may be separate servers physically separated from each other or may be one server only conceptually separated.

Any one of the cartoon data display apparatus 100 and the server 300 may be a statistical data providing apparatus. For example, when the cartoon data display apparatus 100 is a statistical data providing apparatus, the cartoon data display apparatus 100 may obtain cartoon reading information of a user, generate statistical data from the obtained information, and provide the generated statistical data to an external apparatus. When the cartoon data display apparatus 100 is the statistical data providing apparatus, the external apparatus may be a cartoon data display apparatus of another user, the cartoon data providing apparatus 200, or the server 300. As another example, when the server 300 is the statistical data providing apparatus, the server 300 may obtain cartoon reading information of the user of the cartoon data display apparatus 100, generate statistical data from the obtained information, and provide the generated statistical data to the external apparatus. When the server 300 is the statistical data providing apparatus, the external apparatus may be the cartoon data display apparatus 100 or the cartoon data providing apparatus 200.

The communication network 400 connects the cartoon data display apparatus 100, the cartoon data providing apparatus 200, and/or the server 300. In other words, the communication network 400 denotes a communication network providing an access path for the cartoon data display apparatus 100, the cartoon data providing apparatus 200, and/or the server 300 to exchange data including the cartoon data or the statistical data. Examples of the communication network 400 may include wired networks, such as a local area network (LAN), a wide area network (WAN), a metropolitan area network (MAN), and an integrated service digital network (ISDN), and wireless networks, such as wireless LAN, a code division multiple access (CDMA), Bluetooth, and a satellite communication network, but are not limited thereto.

Figure 2:
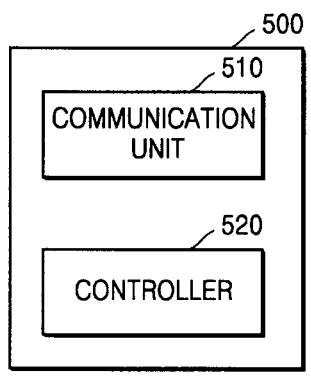
FIG. 2 is a schematic block diagram of an internal structure of a statistical data providing apparatus, according to an embodiment of the present disclosure.

FIG. 2 is a schematic block diagram of the internal structure of a statistical data providing apparatus, according to an embodiment of the present disclosure.

Referring to FIG. 2, a statistical data providing apparatus 500 of the statistical data providing system 10 according to an embodiment of the present disclosure includes a communication unit 510 and a controller 520.

The communication unit 510 performs wired/wireless communication with at least one of the cartoon data display apparatus 100, the cartoon data providing apparatus 200, and the server 300. The communication unit 510 may be a Bluetooth communication unit, a Bluetooth low energy (BLE) communication unit, a near field communication unit, a wireless local area network (WLAN) (Wi-Fi) communication unit, a Zigbee communication unit, an infrared data association (IrDA) communication unit, a Wi-Fi direct (WFD) communication unit, an ultra wideband (UWB) communication unit, or an Ant+ communication unit, but is not limited thereto.

The communication unit 510 may exchange a wired/wireless signal with at least one of the cartoon data display apparatus 100, the cartoon data providing apparatus 200, the server 300, and a base station on the communication network 400. The wired/wireless signal may include data of various types including cartoon data or statistical data. In other words, the communication unit 510 may transmit the cartoon data or statistical data to the cartoon data display apparatus 100, transmit the statistical data to the cartoon data providing apparatus 200, and transmit the cartoon data or statistical data to the server 300. Also, the communication unit 510 may receive cartoon data from the cartoon data providing apparatus 200, and receive cartoon data from the server 300. The communication unit 510 may transmit the statistical data generated by the controller 520 to at least one of the cartoon data display apparatus 100, the cartoon data providing apparatus 200, the server 300, and the base station.

When the statistical data providing apparatus 500 is included in the server 300, the communication unit 510 may receive data about a cartoon reading pattern of the user from the cartoon data display apparatus 100.

The communication unit 510 may be an apparatus including hardware and software required for exchanging various types of data including cartoon data or statistical data through wired/wireless communication with at least one of the cartoon data display apparatus 100, the cartoon data providing apparatus 200, the server 300, and the base station.

The controller 520 generally controls overall operations of the statistical data providing apparatus 500. For example, the controller 520 may generally control the communication unit 510 by executing programs stored in a memory included in the statistical data providing apparatus 500. Here, the memory may include a magnetic storage medium or a flash storage medium, but is not limited thereto.

The controller 520 may include any type of apparatus capable of processing data, such as a processor. Here, the 'processor' may denote, for example, a data processing apparatus embedded in hardware and having a physically structured circuit to perform a function expressed in a code or command included in a program. Examples of the data processing apparatus embedded in hardware may include a microprocessor, a central processing unit (CPU), a processor core, a multiprocessor, an application specific integrated circuit (ASIC), and a field programmable gate array (FPGA), but are not limited thereto.

The controller 520 also analyzes cartoon reading patterns of the user when the user reads the cartoon data. The cartoon reading patterns of the user may include at least one of the number of times the user clicks or touches the cartoon data while reading the cartoon data, a clicked or touched location, whether the cartoon data is scrolled through, the number of times the cartoon data is scrolled through, and a scrolling speed.

The controller 520 may obtain cartoon reading information of the user by analyzing the cartoon reading patterns of the user. The cartoon reading information may include at least one of time spent by the user reading the cartoon data, the number of times the user repeatedly read the cartoon data, the number of times the user scrolled in a reverse direction while reading the cartoon data, the type of cut the user scrolled in a reverse direction while reading the cartoon data, the type, genre, or location of the cartoon data in the middle of which the user stopped reading, the type or genre of the cartoon data the user repeatedly read, whether the user wrote a comment after reading the cartoon data, whether the comment written by the user was positive or negative, whether the user left feedback about the cartoon data, whether the feedback left by the user was positive or negative, the place where the user was reading the cartoon data, the time slot when the user was reading the cartoon data, and the location of a line of sight of the user. When the cartoon reading information includes the location of the line of sight of the user on the display unit of the cartoon data display apparatus, the statistical data providing apparatus 500 may include a sensor for detecting the location of the line of sight of the user, and the controller 520 may detect the location of the line of sight of the user by controlling the sensor.

The controller 520 generates statistical data of the user from the cartoon reading information of the user.

The controller 520 may determine the cartoon reading information itself as the statistical data of the user. In other words, the cartoon reading information, such as the time spent by the user reading the cartoon data or the number of times the user repeatedly read the cartoon data, may function as the statistical data, and thus the cartoon reading information itself may be determined as the statistical data.

Also, the controller 520 may generate the statistical data of the user by digitizing the cartoon reading information of the user. Here, a numerical value of the statistical data may indicate whether the cartoon reading information of the user was positive or negative in view of the cartoonist or a cartoon data provider. When the numerical value of the statistical data is determined to be high when the cartoon reading information of the user is positive, the numerical value may be determined in proportion to the time spent by the user reading the cartoon data. Also, the numerical value may be determined in proportion to the number of times the user repeatedly read the cartoon data. Also, the numerical value may be determined in proportion to the number of times the user scrolled in the reverse direction. Also, when the user stopped reading before completing the cartoon data, the numerical value may be determined to be low. Also, when the user wrote a comment after reading the cartoon data, the numerical value may be determined to be high. Here, if the user wrote a negative comment, the numerical value may be determined to be low. Also, when the user left a feedback indicating 'like' or 'dislike' to the cartoon data, the numerical value may be determined to be high. Here, if the user left a negative feedback, such as 'dislike', the numerical value may be determined to be low.

The statistical data generated by the controller 520 may be transmitted to at least one of the cartoon data display apparatus 100, the cartoon data providing apparatus 200, the server 300, and the base station through the communication unit 510. Accordingly, the statistical data providing apparatus 500 may provide the statistical data to the external apparatus.

The controller 520 may analyze cartoon reading patterns according to users by distinguishing between different users, and obtain cartoon reading information per user. For example, the controller 520 may obtain first cartoon reading information by analyzing cartoon reading patterns of a first user, and obtain second cartoon reading information by analyzing cartoon reading patterns of a second user different from the first user. In this case, the controller 520 may generate statistical data per user by distinguishing between different users. For example, the controller 520 may generate first statistical data from the first cartoon reading information, and generate second statistical data from the second cartoon reading information. The first statistical data and the second statistical data may be distinguished from each other and transmitted to at least one of the cartoon data display apparatus 100, the cartoon data providing apparatus 200, and the server 300 through the communication unit 510. Accordingly, the statistical data providing apparatus 500 may provide, to the external apparatus, pieces of statistical data distinguished according to users.

The controller 520 may analyze cartoon reading patterns of the user with respect to pieces of cartoon data by distinguishing between different pieces of cartoon data, and obtain cartoon reading information per piece of cartoon data of the user. For example, the controller 520 may obtain third cartoon reading information by analyzing cartoon reading patterns when the first user reads first cartoon data, and obtain fourth cartoon reading information by analyzing cartoon reading patterns when the first user reads second cartoon data different from the first cartoon data. In this case, the controller 520 may distinguish between the different pieces of cartoon data and generate statistical data per piece of cartoon data. For example, the controller 520 may generate third statistical data from the third cartoon reading information, and generate fourth statistical data from the fourth cartoon reading information. The third statistical data and the fourth statistical data may be distinguished from each other and transmitted to at least one of the cartoon data display apparatus 100, the cartoon data providing apparatus 200, and the server 300 through the communication unit 510. Accordingly, the statistical data providing apparatus 500 may provide, to the external apparatus, pieces of statistical data distinguished according to pieces of cartoon data.

The controller 520 may generate one piece of statistical data by analyzing cartoon reading patterns when the user reads a plurality of pieces of cartoon data of the same series, a plurality of pieces of cartoon data of the same genre, or a plurality of pieces of cartoon data created by the same writer. For example, the controller 520 may obtain one piece of cartoon reading information by analyzing cartoon reading patterns when the first user reads the first cartoon data and by analyzing cartoon reading patterns when the first user reads the second cartoon data of the same series as the first cartoon data. Then, one piece of statistical data may be generated from the cartoon reading information. As another example, the controller 520 may obtain fifth cartoon reading information by analyzing cartoon reading patterns when the first user reads the first cartoon data, and obtain sixth cartoon reading information by analyzing cartoon reading patterns when the first user reads the second cartoon data of the same series as the first cartoon data. Then, one piece of statistical data may be generated from the fifth cartoon reading information and the sixth cartoon reading information. Accordingly, the statistical data providing apparatus 500 may generate one piece of statistical data from the plurality of pieces of cartoon data of the same series, the plurality of pieces of cartoon data of the same genre, or the plurality of pieces of cartoon data created by the same writer, and provide the generated statistical data to the external apparatus.

The controller 520 may analyze a cartoon reading pattern in consideration of areal features of cartoon data, and generate one piece of statistical data by analyzing cartoon reading patterns when a user reads areas of similar content. For example, a first partial area and a second partial area of cartoon data may depict actions with movement effects, and a third partial area of the cartoon data may depict a static landscape. In this case, the controller 520 may determine that the first and second partial areas include similar content. Accordingly, the controller 520 may obtain one piece of cartoon reading information by analyzing cartoon reading patterns when the user reads the first and second partial areas, and generate one piece of statistical data from the cartoon reading information. Meanwhile, it may be determined that the third partial area includes content different from the first partial area. Accordingly, the controller 520 may generate seventh cartoon reading information by analyzing cartoon reading patterns when the user reads the first partial area, and generate eighth cartoon reading information by analyzing cartoon reading patterns when the user reads the third partial area. Also, the controller 520 may generate fifth statistical data from the seventh cartoon reading information and generate sixth statistical data from the eighth cartoon reading information. The fifth statistical data and the sixth statistical data may be distinguished from each other and provided to at least one of the cartoon data display apparatus 100, the cartoon data providing apparatus 200, or the server 300 through the communication unit 510. The areal features of the cartoon data may include at least one of the number of cuts included in each area, content of a cut, the amount of text, the number of effects, a type of effect, the number of objects, a type of object, whether advertising content is included, and a type of included advertising content.

The controller 520 may consider information directly input by the user while generating statistical data of the user. For example, when the user directly input information that the user is a minor, the controller 520 may provide the statistical data including the information to the external apparatus. The information directly input by the user may include at least one of a cartoon reading speed estimated by the user, a text reading speed estimated by the user, the age of the user, the favorite cartoon genre of the user, a scene the user would like to be longer or shorter, the favorite type of drawing of the user, a cartoon reading habit of the user, and whether the user is a minor, infirm, or pregnant.

When the statistical data providing apparatus 500 is included in the cartoon data display apparatus 100, the controller 520 may control the display unit of the cartoon data display apparatus 100 such that cartoon data is displayed on the display unit of the cartoon data display apparatus 100. The controller 520 may control the display unit of the cartoon data display apparatus 100 such that a partial area of the cartoon data is displayed on the display unit of the cartoon data display apparatus 100. When the user inputs a command to display the cartoon data, the controller 520 may control the display unit of the cartoon data display apparatus 100 such that the partial area of the cartoon data is displayed on the display unit of the cartoon data display apparatus 100. Here, the controller 520 may control the display unit of the cartoon data display apparatus 100 such that the very first area of the cartoon data is displayed initially on the display unit of the cartoon data display apparatus 100. If the user has already read the cartoon data up to a middle area in the past, the controller 520 may control the display unit of the cartoon data display apparatus 100 such that the middle area of the cartoon data is displayed initially on the display unit of the cartoon data display apparatus 100.

Figure 3:
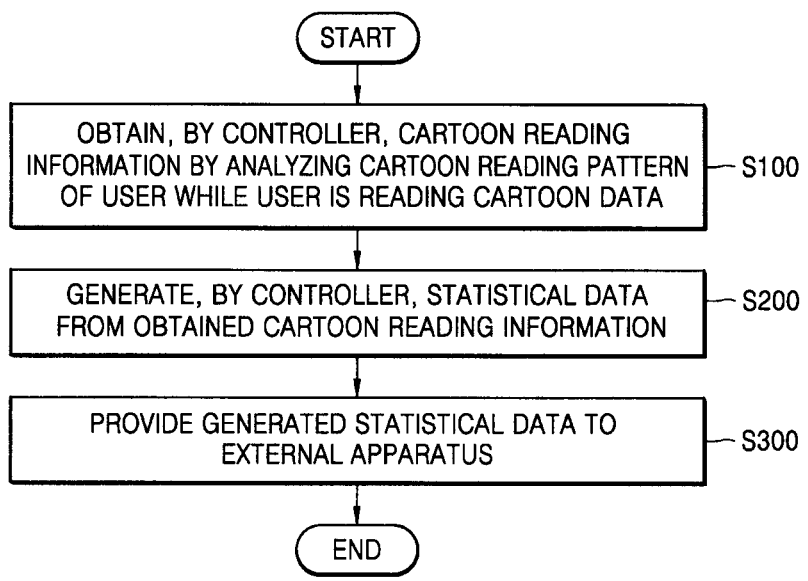
FIG. 3 is a flowchart of a statistical data providing method, according to an embodiment of the present disclosure.

FIG. 3 is a flowchart of a statistical data providing method, according to an embodiment of the present disclosure.

The flowchart of FIG. 3 includes operations that are processed in time series by the statistical data providing apparatus 500 of FIG. 2. Accordingly, details described with reference to components of FIG. 2 are applied to the flowchart of FIG. 3 even if omitted.

Referring to FIG. 3, the method of providing statistical data related to cartoon data, according to an embodiment of the present disclosure includes obtaining, by the controller 520, cartoon reading information by analyzing the cartoon reading pattern of a user while the user is reading cartoon data (operation S100), generating, by the controller 520, statistical data from the obtained cartoon reading information (operation S200), and providing, by the communication unit 510, the generated statistical data to an external apparatus (operation S300).

Also, a statistical data providing method according to an embodiment of the present disclosure may further include detecting, by the controller 520, the location of a line of sight of the user. In this case, the cartoon reading information of the user may include the detected location of the line of sight of the user.

Figure 4A:
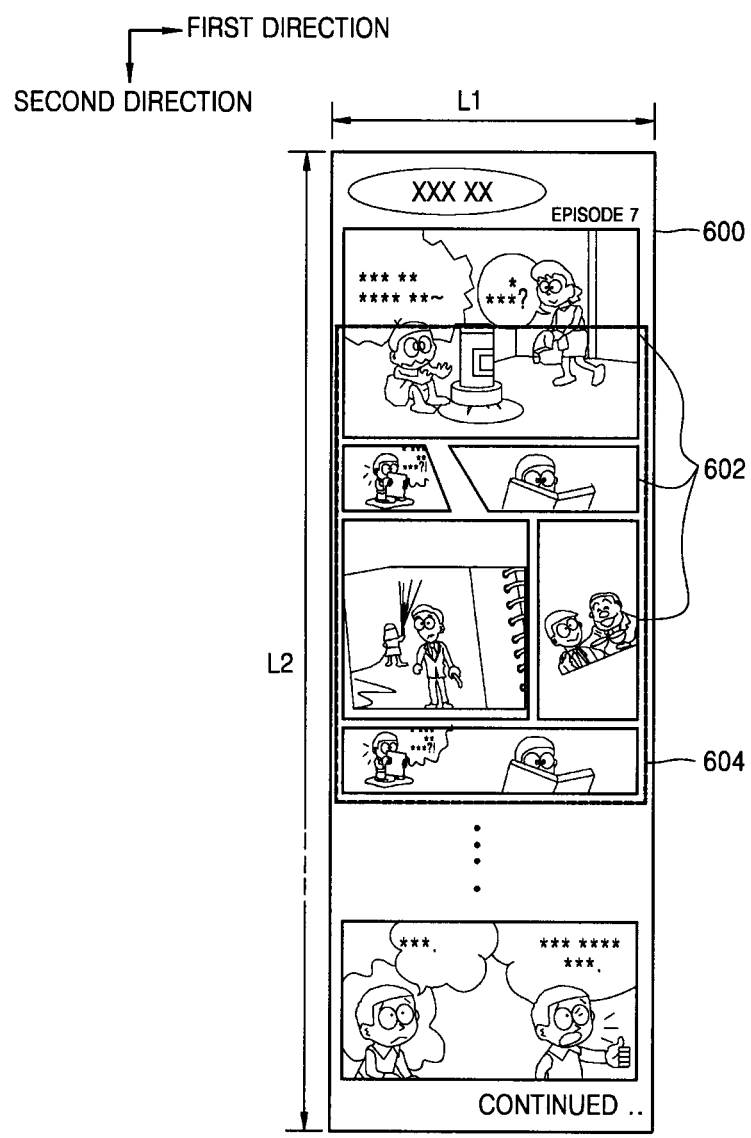
FIGS. 4A and 4B are schematic diagrams of an example of cartoon data and an example of how cartoon data is displayed on a display apparatus, respectively.
Figure 4B:
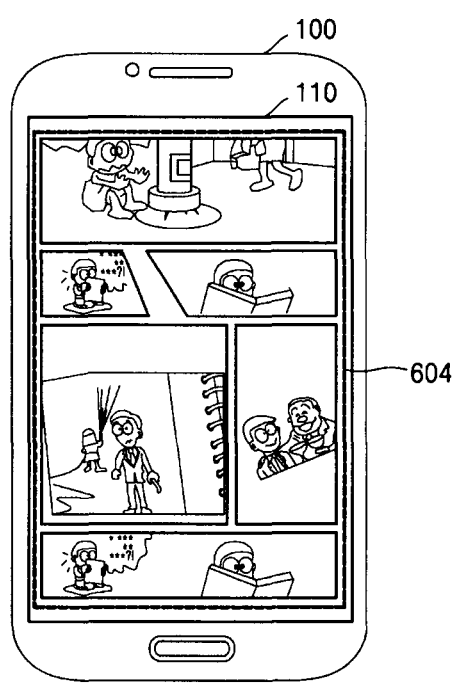

FIGS. 4A and 4B are schematic diagrams of an example of cartoon data and an example of how cartoon data is displayed on a display apparatus, respectively.

Referring to FIGS. 4A and 4B, first cartoon data 600 may include a plurality of cuts 602. A partial area 604 of the first cartoon data 600 may be displayed on a display unit 110 of the cartoon data display apparatus 100.

The first cartoon data 600 may be image data having a rectangular shape having a first length L1 in a first direction and a second length L2 in a second direction perpendicular to the first direction. Here, the second length L2 may be remarkably longer than the first length L1.

The first cartoon data 600 may include the plurality of cuts 602. Each of the plurality of cuts 602 may be an object that is visually recognizable such as an alphabet, a drawing, or a photograph and is capable of transmitting information to another person in a visual form, or a group of such objects.

The partial area 604 of the first cartoon data 600 may be displayed on the display unit 110 of the cartoon data display apparatus 100. In other words, the first cartoon data 600 may be image data having a size too large to be displayed all at once on the display unit 110 of the cartoon data display apparatus 100. Also, the first cartoon data 600 may be image data in which the second length L2 is remarkably longer than the first length L1. Accordingly, only the partial area 604 of the first cartoon data 600 may be displayed on the display unit 110 of the cartoon data display apparatus 100 at one time, and another area of the first cartoon data 600 may be displayed on the display unit 110 of the cartoon data display apparatus 100 at another time.

FIG. 4A merely illustrates an example of the cartoon data, and the cartoon data may be image data having a polygonal shape other than the rectangular shape or having a circular shape, or the cartoon data may include not only the image data but also sound data, but is not limited thereto.

Figure 5A:
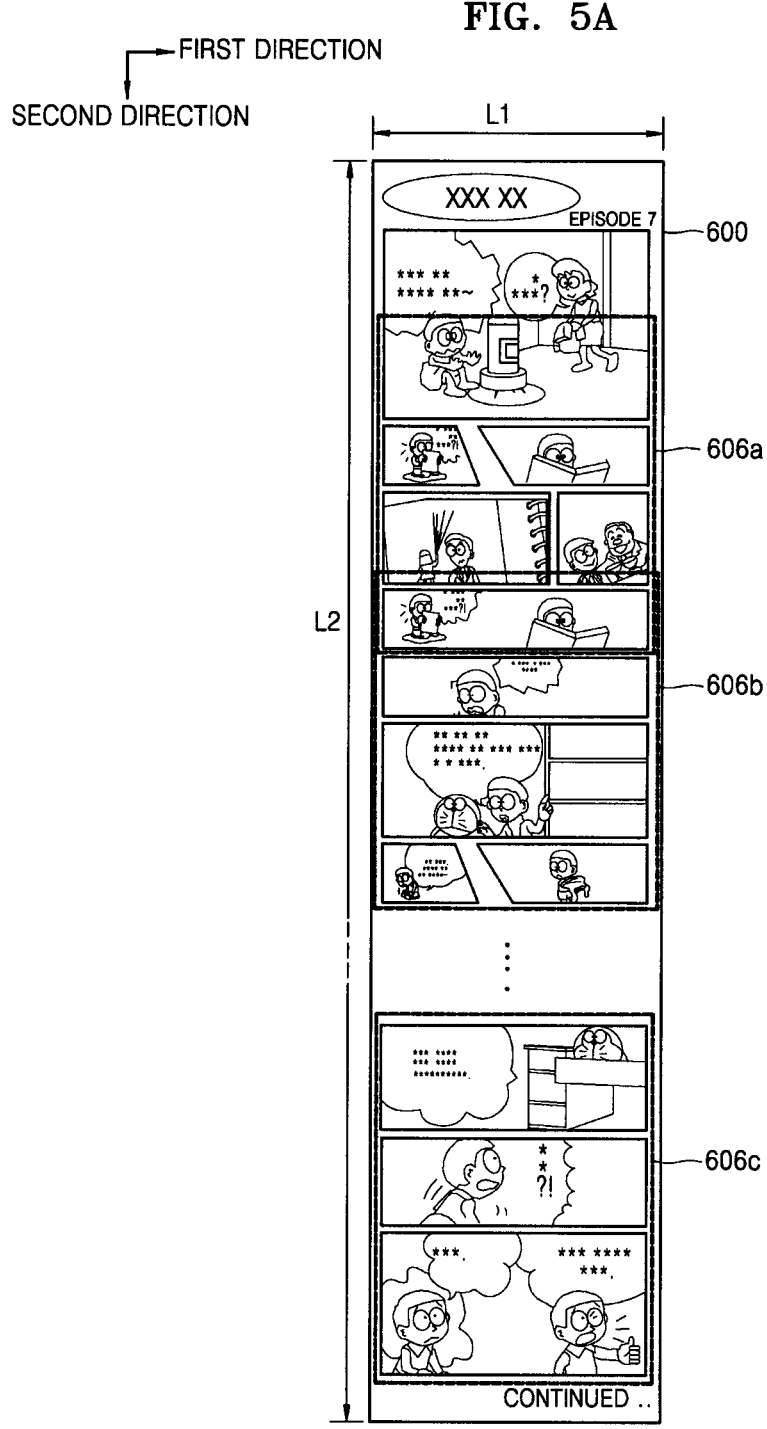
Figure 5B:
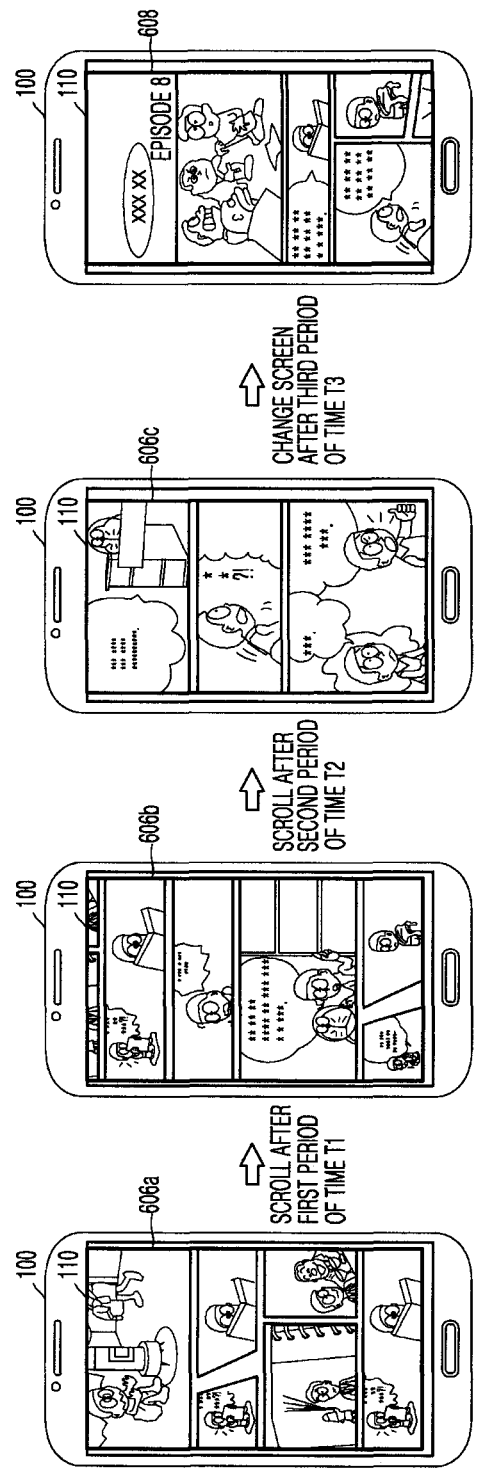

FIGS. 5A through 5C are schematic diagrams for describing a method of obtaining cartoon reading information for generating statistical data by the statistical data providing apparatus 500, according to an embodiment of the present disclosure.

Referring to FIGS. 5A through 5C, the first cartoon data 600 may include a first partial area 606a, a second partial area 606b, and a third partial area 606c of the first cartoon data 600. The first partial area 606a, the second partial area 606b, or the third partial area 606c of the first cartoon data 600 may be displayed on the display unit 110 of the cartoon data display apparatus 100. A partial area 608 of second cartoon data may be displayed on the display unit 110 of the cartoon data display apparatus 100.

The statistical data providing apparatus 500 may obtain cartoon reading information about a period of time when each of partial areas is displayed on the display unit 110 of the cartoon data display apparatus 100. For example, as shown in a first (leftmost) diagram of FIG. 5B, the cartoon data display apparatus 100 may display the first partial area 606a on the display unit 110. Then, when a command to display the second partial area 606b is received according to a direct or indirect command of a user of the cartoon data display apparatus 100, the cartoon data display apparatus 100 may display the second partial area 606b on the display unit 110 as shown in a second diagram (adjacent to the first diagram) of FIG. 5B. Here, the statistical data providing apparatus 500 may obtain information about a period of time when the first partial area 606a is displayed on the display unit 110. In other words, when the second partial area 606b is displayed on the display unit 110 after the first partial area 606a is displayed on the display unit 110 for a first period of time T1, the statistical data providing apparatus 500 may obtain information that the first partial area 606a is displayed for the first period of time T1.

Similarly, as shown in the second diagram of FIG. 5B, the cartoon data display apparatus 100 may display the second partial area 606b on the display unit 110. Then, when a command to display the third partial area 606c is received according to a direct or indirect command of the user of the cartoon data display apparatus 100, the cartoon data display apparatus 100 may display the third partial area 606c on the display unit 110 as shown in a third diagram (adjacent to the second diagram) of FIG. 5B. Here, the statistical data providing apparatus 500 may obtain information about a period of time when the second partial area 600b is displayed on the display unit 110. In other words, when the third partial area 606c is displayed on the display unit 110 after the second partial area 606b is displayed on the display unit 110 for a second period of time T2, the statistical data providing apparatus 500 may obtain information that the second partial area 606b is displayed for the second period of time T2.

As shown in a third diagram of FIG. 5B, when the third partial area 606c is the last area of the first cartoon data 600, the cartoon data display apparatus 100 may receive a command to end displaying of the first cartoon data 600 according to a direct or indirect command of the user of the cartoon data display apparatus 100. In this case, as shown in a fourth diagram (adjacent to the third diagram) of FIG. 5B, the cartoon data display apparatus 100 may display the partial area 608 of the second cartoon data different from the first cartoon data 600 on the display unit 110. Here, the statistical data providing apparatus 500 may obtain information about a period of time when the third partial area 606c is displayed on the display unit 110. In other words, a screen is changed after the third partial area 606c is displayed on the display unit 110 for a third period of time T3, the statistical data providing apparatus 500 may obtain information that the third partial area 606c is displayed for the third period of time.

When the statistical data providing apparatus 500 is the cartoon data display apparatus 100, the statistical data providing apparatus 500 may directly measure the period of time when each of the partial areas is displayed on the display unit 110. When the statistical data providing apparatus 500 is the server 300, the statistical data providing apparatus 500 may directly measure the period of time when each of the partial areas is displayed on the display unit 110 of the cartoon data display apparatus 100 or may receive the period of time from the cartoon data display apparatus 100.

In the fourth diagram of FIG. 5B, the partial area 608 of the second cartoon data different from the first cartoon data 600 is displayed on the display unit 110, but the present disclosure is not limited thereto, and a list of cartoon series including the first cartoon data 600 may be displayed on the display unit 110 or a separate image irrelevant to the first cartoon data 600 may be displayed on the display unit 110.

The statistical data providing apparatus 500 may obtain cartoon reading information about the number of times the user scrolled in a reverse direction or the type of cut the user scrolled in the reverse direction. For example, as shown in a first (leftmost) diagram of FIG. 5C, the cartoon data display apparatus 100 may display the first partial area 606a on the display unit 110. Then, when a command to display the second partial area 606b is received according to a direct or indirect command of the user of the cartoon data display apparatus 100, the cartoon data display apparatus 100 may display the second partial area 606b on the display unit 110 as shown in a second diagram (adjacent to the first diagram) of FIG. 5C. Then, when a command to display the third partial area 606c is received according to a direct or indirect command of the user of the cartoon data display apparatus 100, the cartoon data display apparatus 100 may display the third partial area 606c on the display unit 110 as shown in a third diagram (adjacent to the second diagram) of FIG. 5C. Then, when a command to display the second partial area 606b again is received according to a direct or indirect command of the user of the cartoon data display apparatus 100, the cartoon data display apparatus 100 may display the second partial area 606b again on the display unit 110 as shown in a fourth diagram (adjacent to the third diagram) of FIG. 5C. Here, the statistical data providing apparatus 500 may detect that the user input a command to scroll the cartoon data in the reverse direction. The command to scroll the cartoon data in the reverse direction may be a scroll in the reverse direction via an input device of the user. At this time, the statistical data providing apparatus 500 may obtain the number of times the user scrolled in the reverse direction. Also, the statistical data providing apparatus 500 may obtain the information about the cut the user scrolled in the reverse direction.

In FIGS. 5B and 5C, the time spent by the user reading the cartoon data, the number of times the user scrolled in the reverse direction, or the type of cut the user scrolled in the reverse direction is shown as an example of the cartoon reading information obtained by the statistical data providing apparatus 500, but the present disclosure is not limited thereto. In other words, the cartoon reading information obtained by the statistical data providing apparatus 500 may include various types of information about the user reading the cartoon data, such as the number of times the user repeatedly read the cartoon data, the type, genre, or location of the cartoon data in the middle of which the user stopped reading, a type or genre of the cartoon data the user repeatedly read, whether the user wrote a comment after reading the cartoon data, whether the comment written by the user was positive or negative, whether the user left feedback about the cartoon data, whether the feedback left by the user was positive or negative, a place where the user was reading the cartoon data, a time slot when the user was reading the cartoon data, and the location of a line of sight of the user.

Figure 6A:
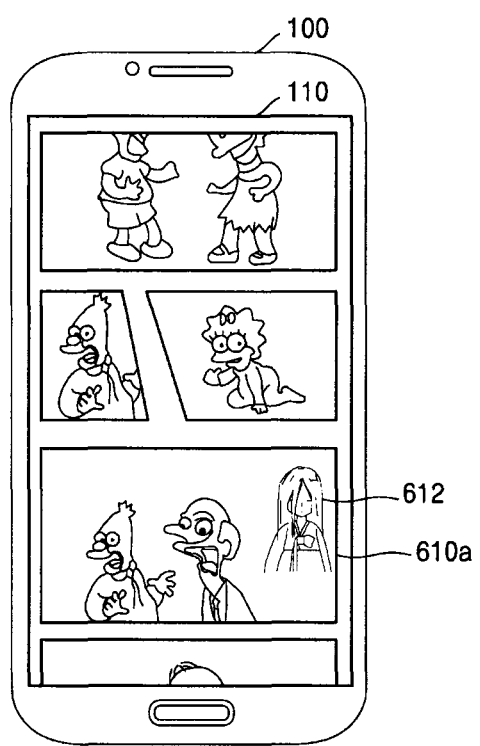
FIGS. 6A and 6B are schematic diagrams for describing a method of using statistical data.
Figure 6B:
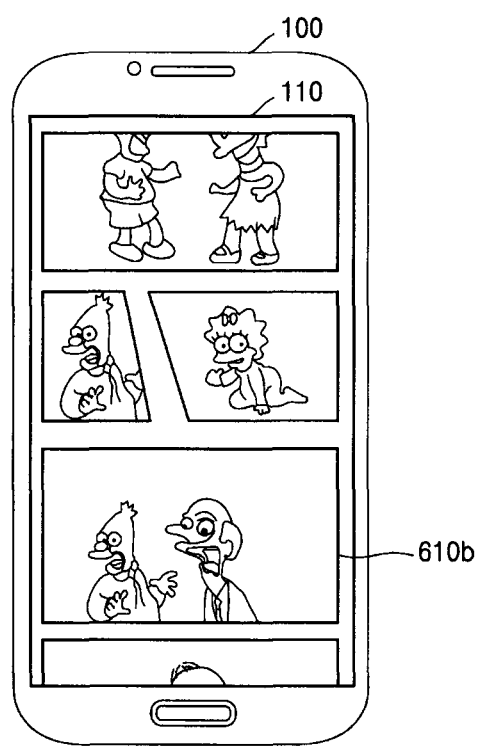

FIGS. 6A and 6B are schematic diagrams for describing a method of using statistical data.

Referring to FIGS. 6A and 6B, a partial area of cartoon data may be displayed on the display unit 110 of the cartoon data display apparatus 100. The partial area of the cartoon data may include a first cut 610a, 610b.

The cartoon data display apparatus 100 may display or not display, on the display unit 110, a certain layer based on statistical data of a user while displaying the partial area of the cartoon data. For example, when it is determined by referring to the statistical data that the frequency of a user reading horror cartoon data is high, the cartoon data display apparatus 100 may display a first cut 610a including a ghostly FIG. 612, for example, on the display unit 110, as shown in FIG. 6A. As another example, when the user does not enjoy horror cartoon data by referring to the statistical data, the cartoon data display apparatus 100 may display a first cut 610b not including the ghost 612 on the display unit 110 as shown in FIG. 6B. The cartoon data display apparatus 100 may determine a layer to be displayed or not displayed based on the statistical data, and the server 300 may transmit only a layer to be displayed based on the statistical data to the cartoon data display apparatus 100 and may not transmit a layer to be not displayed to the cartoon data display apparatus 100.

FIGS. 6A and 6B illustrate displaying of a certain layer as an example of using statistical data, but the present disclosure is not limited thereto. In other words, the statistical data may be used for various purposes, such as selecting cartoon data to be recommended to the user, determining a scroll amount of cartoon data corresponding to a scroll operation of the user, determining insertion of an advertising image to a certain location, and determining a type of an advertising image to be inserted, and as reference data of a cartoonist and reference data of a cartoon provider.

One or more of the above embodiments may be embodied in the form of a computer program that can be run in a computer through various elements. The computer program may be recorded on a computer-readable recording medium. Examples of the computer-readable recording medium include magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories). Furthermore, the computer program may be transmitted and distributed in a network, e.g., software or an application. Examples of the computer programs may include mechanical code prepared by a compiler, and high-level languages executable by a computer by using an interpreter.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

It should be understood that embodiments described herein should be considered in a descriptive sense only and not for purposes of limitation. Descriptions of features or aspects within each embodiment should typically be considered as available for other similar features or aspects in other embodiments.

Embodiments of the present disclosure relate to a statistical data providing method and a statistical data providing apparatus, which provide statistics of various features of people reading cartoon data by distinguishing and providing pieces of statistical data generated from different users or different pieces of cartoon data, and providing statistical data generated in consideration of a cartoon reading time of a user, whether the user repeatedly read a cartoon, whether the user stopped reading the cartoon, whether the user wrote a comment, or whether the user left feedback about the cartoon.

The invention claimed is:

1. A method of providing and using statistical data related to cartoon data provided to a cartoon data display apparatus, the method comprising:

obtaining, by a controller, first cartoon reading information by analyzing a cartoon reading pattern of a first user when the first user reads first cartoon data on the cartoon data display apparatus, wherein the first cartoon data includes a plurality of cuts and the cartoon data display apparatus displays a plurality of partial areas including cuts of the plurality of cuts of the first cartoon data based on user input commands to scroll the cartoon data, wherein the cartoon reading pattern includes at least one of: a number of times the first user clicks or touches the first cartoon data while reading the first cartoon data, a clicked or touched location of the first cartoon data, information whether the first cartoon data is scrolled through, a number of times the first cartoon data is scrolled through, and a scrolling speed;

generating, by the controller, first statistical data from the obtained first cartoon reading information by digitizing the first cartoon reading information;

providing, by a communication unit, the generated first statistical data to an external apparatus in communication with the controller, wherein the obtaining the first cartoon reading information comprises analyzing the cartoon reading pattern of the first user in consideration of areal features of the first cartoon data, and wherein the areal features of the first cartoon data comprise at least one of a number of cuts of the plurality of cuts included in each partial area of the plurality of partial areas, content of a cut of the plurality of cuts, an amount of text, a number of effects, a type of an effect, a number of objects, a type of an object, whether advertising content is included, and a type of included advertising content;

and displaying a certain layer, transmitted by the external apparatus to the cartoon data display apparatus, on a particular cut of a particular partial area while displaying the particular partial area of a subsequent cartoon data provided to the cartoon data display apparatus for the first user based on determined first statistical data, wherein the certain layer includes a visual object.

2. The method of claim 1, further comprising:

obtaining third cartoon reading information by analyzing a cartoon reading pattern of the first user when the first user reads second cartoon data different from the first cartoon data;

generating third statistical data from the obtained third cartoon reading information; and providing the generated third statistical data to the external apparatus after distinguishing the third statistical data from the first statistical data.

3. The method of claim 1, wherein the obtaining the first cartoon reading information comprises analyzing a cartoon reading pattern when the first user reads cartoon data of a same series as the first cartoon data, cartoon data of a same genre as the first cartoon data, or cartoon data created by a same cartoonist as the first cartoon data.

4. The method of claim 1, further comprising:

obtaining fourth cartoon reading information by analyzing a cartoon reading pattern when the first user reads cartoon data of a same series as the first cartoon data, cartoon data of a same genre as the first cartoon data, or cartoon data created by a same cartoonist as the first cartoon data; and generating the first statistical data in consideration of the first cartoon reading information and the fourth cartoon reading information together.

5. The method of claim 1, wherein the first cartoon reading information comprises at least one of a time spent by the first user reading the first cartoon data, a number of times the first user repeatedly read the first cartoon data, a number of times the first user scrolled in a reverse direction while reading the first cartoon data, a type of cut scrolled in a reverse direction by the user while reading the first cartoon data, whether the first user stopped reading the first cartoon data, whether the first user wrote a comment on the first cartoon data, whether the comment written by the first user was positive or negative, whether the first user left feedback about the first cartoon data, and whether the feedback of the first user was positive or negative.

6. The method of claim 1, further comprising detecting, by the controller, a location of a line of sight of the first user, wherein the first cartoon reading information comprises the location of the line of sight of the first user.

7. The method of claim 1, wherein the generating the first statistical data comprises determining the first cartoon reading information itself as the first statistical data.

8. The method of claim 1, wherein the first statistical data is generated in consideration of input information directly input by the first user, wherein the input information comprises at least one of a cartoon reading speed of the first user, a text reading speed of the first user, an age of the first user, a favorite genre of the first cartoon data of the first user, a favorite scene of the first user, and whether the first user is infirm or pregnant.

9. The method of claim 1, wherein the external apparatus comprises at least one of the cartoon data display apparatus used by the first user reading the first cartoon data, an apparatus used by a cartoonist of the first cartoon data to create the first cartoon data, and a server for providing the first cartoon data.

10. The method of claim 1, further comprising:

obtaining second cartoon reading information by analyzing a cartoon reading pattern of a second user different from the first user;

generating second statistical data from the obtained second cartoon reading information; and providing the generated second statistical data to the external apparatus after distinguishing the second statistical data from the first statistical data.

11. A non-transitory computer readable recording medium storing a computer program for providing and using statistical data related to cartoon data provided to a cartoon data display apparatus, the program when executed by a computer performing the steps comprising:

obtaining, by a controller, first cartoon reading information by analyzing a cartoon reading pattern of a first user when the first user reads first cartoon data on the cartoon data display apparatus, wherein the first cartoon data includes a plurality of cuts and the cartoon data display apparatus displays a plurality of partial areas including cuts of the plurality of cuts of the first cartoon data based on user input commands to scroll the cartoon data, wherein the cartoon reading pattern includes at least one of: a number of times the first user clicks or touches the first cartoon data while reading the first cartoon data, a clicked or touched location of the first cartoon data, information whether the first cartoon data is scrolled through, a number of times the first cartoon data is scrolled through, and a scrolling speed;

generating, by the controller, first statistical data from the obtained first cartoon reading information and second statistical data from the obtained second cartoon reading information by digitizing the first cartoon reading information;

providing, by a communication unit, the generated first statistical data to an external apparatus in communication with the controller, wherein the obtaining the first cartoon reading information comprises analyzing the cartoon reading pattern of the first user in consideration of areal features of the first cartoon data, and wherein the areal features of the first cartoon data comprise at least one of a number of cuts of the plurality of cuts included in each partial area of the plurality of partial areas, content of a cut of the plurality of cuts, an amount of text, a number of effects, a type of an effect, a number of objects, a type of an object, whether advertising content is included, and a type of included advertising content;

and displaying a certain layer, transmitted by the external apparatus to the cartoon data display apparatus, on a particular cut of a particular partial area while displaying the particular partial area of a subsequent cartoon data provided to the cartoon data display apparatus for the first user based on determined first statistical data, wherein the certain layer includes a visual object.

12. A distribution server distributing a program for providing and using statistical data related to cartoon data provided to a cartoon data display apparatus, the distribution server comprising:

a memory comprising the program; and, a communication unit for distributing the program, and wherein the program, when executed by a computer performs the steps comprising:

obtaining, by a controller, first cartoon reading information by analyzing a cartoon reading pattern of a first user when the first user reads first cartoon data on the cartoon data display apparatus, wherein the first cartoon data includes a plurality of cuts and the cartoon data display apparatus displays a plurality of partial areas including cuts of the plurality of cuts of the first cartoon data based on user input commands to scroll the cartoon data, wherein the cartoon reading pattern includes at least one of: a number of times the first user clicks or touches the first cartoon data while reading the first cartoon data, a clicked or touched location of the first cartoon data, information whether the first cartoon data is scrolled through, a number of times the first cartoon data is scrolled through, and a scrolling speed;

generating, by the controller, first statistical data from the obtained first cartoon reading information by digitizing the first cartoon reading information;

providing, by a communication unit, the generated first statistical data to an external apparatus in communication with the controller, wherein the obtaining the first cartoon reading information comprises analyzing the cartoon reading pattern of the first user in consideration of areal features of the first cartoon data, and wherein the areal features of the first cartoon data comprise at least one of a number of cuts of the plurality of cuts included in each partial area of the plurality of partial areas, content of a cut of the plurality of cuts, an amount of text, a number of effects, a type of an effect, a number of objects, a type of an object, whether advertising content is included, and a type of included advertising content;

and displaying a certain layer, transmitted by the external apparatus to the cartoon data display apparatus, on a particular cut of a particular partial area while displaying the particular partial area of a subsequent cartoon data provided to the cartoon data display apparatus for the first user based on determined first statistical data, wherein the certain layer includes a visual object.

* * * * *